(12) United States Patent
Beutin et al.

(10) Patent No.: US 7,351,174 B2
(45) Date of Patent: Apr. 1, 2008

(54) TWIN TURBO-SHAFT ENGINE WITH ACCESSORY GEARBOX DRIVE MEANS

(75) Inventors: Bruno Beutin, Evry (FR); Jeremy Fert, Paris (FR)

(73) Assignee: SNECMA, Paris (FR)

( * ) Notice: Subject to any disclaimer, the term of this patent is extended or adjusted under 35 U.S.C. 154(b) by 236 days.

(21) Appl. No.: 11/333,506

(22) Filed: Jan. 18, 2006

(65) Prior Publication Data
US 2006/0183593 A1    Aug. 17, 2006

(30) Foreign Application Priority Data
Jan. 20, 2005    (FR) .................................. 05 50182

(51) Int. Cl.
*F16H 3/72* (2006.01)
*B64D 35/00* (2006.01)
(52) U.S. Cl. ............................. 475/6; 244/60
(58) Field of Classification Search ............ 475/1, 475/6, 9, 329; 244/60
See application file for complete search history.

(56) References Cited
FOREIGN PATENT DOCUMENTS
FR    2 520 806    8/1983
GB    839961    6/1960

OTHER PUBLICATIONS

U.S. Appl. No. 11/333,506, filed Jan. 18, 2006, Beutin et al.
U.S. Appl. No. 11/276,012, filed Feb. 9, 2006, Bart et al.

*Primary Examiner*—Dirk Wright
(74) *Attorney, Agent, or Firm*—Oblon, Spivak, McClelland, Maier & Neustadt, P.C.

(57) ABSTRACT

The twin turbo-shaft engine according to the invention comprises a high pressure rotor and a low pressure rotor, at least one accessory gearbox driven by mechanical transmission means, main drive pinion means, on each rotor, driving power transmission means each associated with an input to a differential, the output of which drives a drive shaft of the accessory gearbox. It is characterised by the fact that the power transmission means extend in two different structural arms, the power transmission means of one of the rotors being connected to a power transfer box fulfilling two functions, firstly transmission of power to an input to the differential, and secondly modification of the transmission speed.

Figure 1:
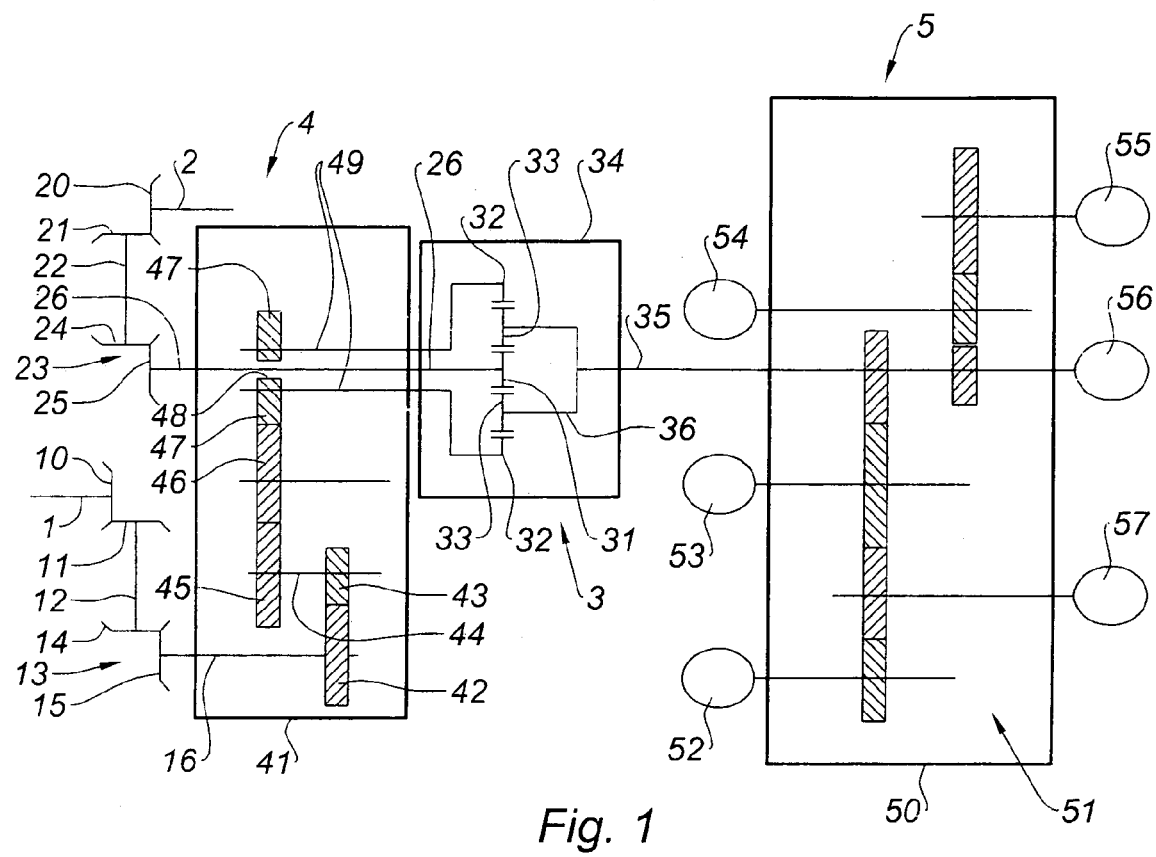

The required space in each arm is thus reduced and the efficiency of the accessory gearbox is high.

6 Claims, 1 Drawing Sheet

TWIN TURBO-SHAFT ENGINE WITH ACCESSORY GEARBOX DRIVE MEANS

The invention relates to a twin turbo-shaft engine with accessory gearbox drive means.

Part of the power generated by an aeronautical turbo-shaft engine is used to supply power to different systems, including the turbo-shaft engine and also the aircraft propelled partly by the turbo-shaft engine.

A part of this power is currently drawn off at the high pressure compressor, for which compressed air is used particularly for pressurisation and air conditioning of the aircraft cabin, or de-icing. Another part of this power is mechanically drawn off from the shaft of the high pressure (HP) body of the turbo-shaft engine to drive the input shaft of an accessory gearbox. This input shaft is driven in rotation by a transmission shaft extending in a structural arm of the case and itself driven by a gear fixed to the HP shaft.

The Accessory GearBox (AGB) well known to those skilled in the art comprises different machines or accessories, for example an electricity generator, a starter, an alternator, hydraulic, oil and fuel pumps, etc. These various accessories are driven mechanically by the power drawn off from the HP shaft, as has just been seen.

The current trend is to increase the proportion of mechanical power drawn off due to the increasing role of electrical means, considered to be more flexible in use on the aircraft.

However, drawing off excessive power has a deleterious effect on operation of the HP body because it can cause hunting of the compressor, particularly when the engine is running at low speed.

Prior art describes how to draw off part of the mechanical power from the low pressure (LP) body. Various solutions are envisaged. Document FR 2 606 077 discloses that rotors of the turbo-shaft engine can be connected directly to the two inputs to a differential placed closed to the rotors. However, such an arrangement is not always possible due to the space that this placement involves in the core of the turbo-shaft engine. Document GB 973 388 describes the drive of the accessory gearbox for an industrial turbine located on the outer case of the turbine, by main drive pinions on the HP shaft and the LP shaft; however, the main drive pinions on each shaft are connected to the accessory gearbox through large volume gears. This is impossible in a modern turbo-shaft engine in which these gears must pass through the structural arms of the case. Furthermore, document U.S. Pat. No. 4,776,163 describes a turbo-shaft engine in which the HP and LP shafts may alternately drive the accessory gearbox. Apart from the fact that the powers of these two shafts are not coupled together, this embodiment has the disadvantage that two power transmission shafts concentric with each other are used, which is not always possible if other elements such as auxiliaries have to pass through the arm. The auxiliaries may consist of fluid transport pipes or electrical cables for transporting energy or information (for example velocity probe).

The applicant has deposited French patent application No. FR 03 14 429 related to a twin turbo-shaft engine in which the accessory gearbox is driven by the LP and HP shafts connected through transmission arms, each passing within a structural arm and connected to the two inputs to a differential connected to the output from the accessory gearbox drive shaft.

The invention is intended to disclose a twin turbo-shaft engine in which mechanical power is drawn off at the HP and LP shafts, and the power transmission is designed to minimise dimensions and to drive the accessory gearbox input shaft from a differential coupling the power of the LP shaft and the power of the HP shaft. The problem arises particularly for a large turbo-shaft engine which enables installation of the accessory gearbox around the outer case of the compressor, on the output side of the fan case; such an installation can improve the aerodynamic profile of the nacelle surrounding the engine and result in a saving of mass at the nacelle. In this case, the power transmission shafts extend in the structural arms and are output from them through a transfer gearbox at the compressor case on which the accessory gearbox is installed. In such a turbo-shaft engine, it is desirable for the transmission shafts to extend in the different successive structural arms so as to minimise the dimensions in each arm. It is important to be sure that the main drive pinion on the HP shaft does not interfere with the main drive pinion on the LP shaft, even though the size of the main drive pinions is always within a very small range due to the minimum size of a pinion imposed by standard practice, and the available space. Therefore it is impossible to significantly increase the power transmission speed at this level. Furthermore, the volume of the system must be minimal due to the congestion in this area of the case and inside the arms. Therefore the genuine adaptation of the transmission ratio to adapt the transmission speed to the speed required at the input to the differential can only start at the transfer gearbox that is itself located in a very congested area.

Obviously, the scope of this application includes all turbo-shaft engines.

Thus, the invention relates to a twin turbo-shaft engine comprising a high pressure rotor and a low pressure rotor, at least one accessory gearbox driven by mechanical transmission means, main drive pinion means on each rotor, driving power transmission means each associated with an input to a differential, the output of which drives a drive shaft of the accessory gearbox, characterised by the fact that the power transmission means extend in two different structural arms, the power transmission means of one of the rotors being connected to a power transfer box fulfilling two functions, firstly transmission of power to an input to the differential, and secondly modification of the transmission speed.

With the invention, power transmission means extend in different structural arms, which reduces the required space in the arms and therefore makes it possible to guide other elements such as auxiliaries. Furthermore, the powers of the rotors are coupled at the differential, which improves the drive efficiency of the accessory gearbox. The use of a transfer box provides a means of spreading the increase in the transmission speed from the rotor as far as the input to the differential, to make it compatible with the input required for the differential while minimising the size of the power transmission system from the HP and LP rotors as far as the accessory gearbox.

Figure 2:
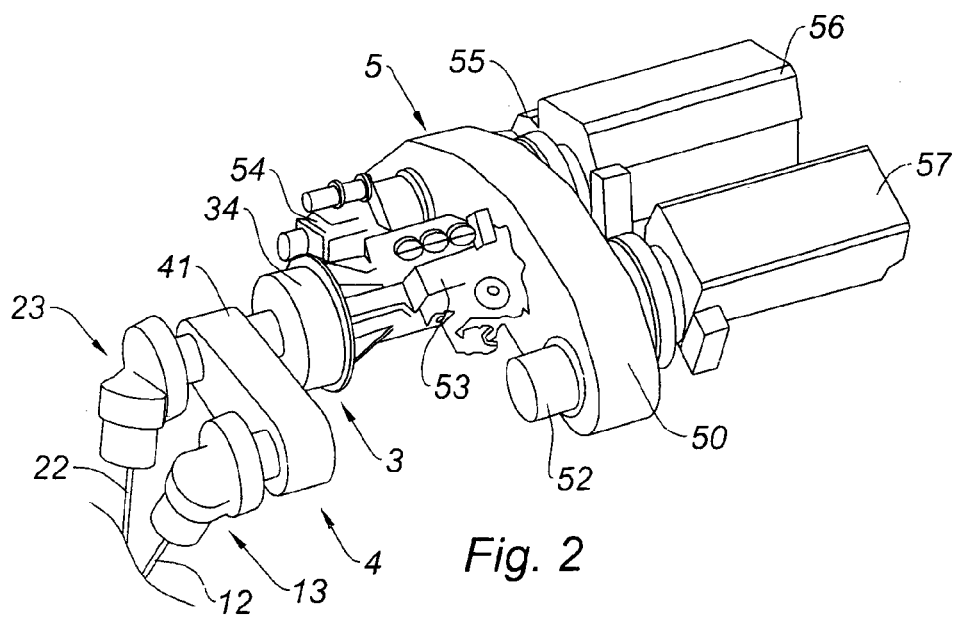

The invention will be better understood after reading the following description of the preferred embodiment of the turbo-shaft engine according to the invention with reference to the attached plate on which:

FIG. 1 is a functional diagrammatic view of the power transmission system of the turbo-shaft engine according to the invention, from the HP and LP rotors as far as the accessory gearbox, and FIG. 2 is a perspective diagrammatic view of the system in FIG. 1.

FIGS. 1 and 2 both show practically all of the power transmission system from the HP and LP rotors as far as the accessory gearbox, the other elements of the turbo-shaft engine not being shown because they are well known to those skilled in the art.

With reference to these FIGS. 1 and 2, the turbo-shaft engine according to the invention is a twin turbo-shaft engine comprising a low pressure (LP) rotor 1 and a high pressure (HP) rotor 2. This type of turbo-shaft engine is well known to a person skilled in the art. For example, it may be a turbojet or a turboprop. It is actually any turbo-shaft engine comprising a compressor and a twin turbine including a low pressure body and a high pressure body. Rotor 1 comprises a bevel pinion 10 and rotor 2 comprises a bevel pinion 20 at its periphery, in the longitudinal direction, substantially at the structural arms of the fan frame of the turbo-shaft engine. The pinion 20 of the HP rotor 2 is located on the input side of this rotor, the pinion 10 of the LP rotor 1 being located on the input side of this end. The fan frame is a structural case, for which an outer case is located in line with and on the output side of the fan case, comprising structural arms and that in particular is the case to which the input-side engine nacelle stub to the aircraft to be propelled by the turbo-shaft engine is fixed.

Each bevel pinion 10, 20 engages with a second bevel pinion 11, 21 respectively, to give a 90° transfer gearbox. Depending on the congestion at these gears (10, 11) (20, 21) and their angular and radial spacing from each other, a first increase in the transmission speed due to the difference in the number of their teeth may be provided at each pair of power transfer pinions (10, 11) (20, 21). Each second bevel pinion 11, 21 is fixed to a transmission shaft 12, 22 that extends radially outwards from the turbo-shaft engine in a structural arm of the fan frame. In this case, these shafts 12, 22 extend in two successive structural arms of the fan frame. The external radial end of each of these transmission arms 12, 22 is connected to a bevel gearbox 13, 23 respectively. In fact, each of these gearboxes 13, 23 houses a bevel pinion 14, 24 fixed to the transmission arm 12, 22 that engages with a second bevel pinion 15, 25 to form the transfer gearbox, in this case at 90°. The transmission speed can be increased again at the pair of gears (14, 24), (15, 25) in each transfer gearbox 13, 23.

The second bevel pinion 25 in the transfer gearbox 23 of the HP rotor 2 is fixed to a shaft 26 that is the first input shaft to a differential 3. A differential 3 is a mechanical gear with the function of connecting two input shafts and an output shaft driven by the input shafts. Such a gear usually, and in this case, comprises a planet gear 31, a cage 32 and satellites 33, each of these elements 31, 32, 33 performing the function of an input or the output. The assembly is housed in a casing 34. In fact, the first input shaft 26 is force fitted directly into the planet gear 31 of the differential 3.

The bevel pinion 15 of the transfer gearbox 13 of the LP rotor 1 is fixed to a shaft 16 that is the input shaft of a power transmission box 4. This box 4 performs two functions, firstly transmission of power to the other input to the differential 3 and modification of the transmission speed. In this case it is required to increase the transmission speed. The transmission gearbox 4 comprises a casing 41 in which its various constituents are arranged. In the case considered, the input shaft 16 to the transmission gearbox 4 comprises a straight pinion 42 at its end contained in this gearbox 4 that engages with a straight pinion 43 comprising less teeth than itself, itself fixed to a shaft 44 on which a straight pinion 45 is fitted at its end and comprises more teeth than itself, that engages with a straight pinion 46 comprising less teeth than itself. Therefore there is an increase in the transmission speed from the input shaft 16 of the gearbox 4 as far as this straight pinion 46, in other words an increase in the shaft rotation speed. This straight pinion 46 engages with a final pinion 47, containing approximately the same number of teeth as itself, one of the functions being to change the direction of rotation of the gear at this location. This last pinion 47 comprises a central reaming 48 through which the first input shaft 26 of the differential 3 extends, concentrically with a second input shaft 49 of the differential 3, which is tubular and fixed to the final gear 47, extending from this final gear to the output side of the turbo-shaft engine. Another function of this last gear 47, achieved by judicious sizing, is to keep the two input shafts 26, 49 of the differential 3 coaxial. The second input shaft 49 of the differential 3 is fixed to the cage 32 of the differential. Note that the LP rotor 1 and the HP rotor 2 are rotating in opposite directions, but the input shafts 26, 49 of the differential 3 rotate in the same direction. The invention is applicable to the LP rotor 1 and the HP rotor 2 that rotate in the same direction; all that is necessary is to modify the number of pinions in the power transmission system.

Due to the combination of pinions in the power transmission box 4 with the first increases in the transmission speed that take place at the power transmission pinions 10, 11 at the LP shaft 1 and at the pinions 14, 15 in the transfer gearbox 13, the adaptation of the LP shaft rotation speed 1 to the required speed at the input to differential 3 takes place progressively along the power transmission system which enables the use of pinions that are not too large, since the increase in the transmission speed takes place progressively in steps. In fact, the ratio of the speed of the second input shaft 49 of the differential 3 to the speed of the LP shaft 1 is equal to 4.35. Furthermore, the power transmission gearbox 4 enables routing of the power output from the LP shaft 1 to the first input shaft 26 of the differential 3 and therefore enables the two inputs 26, 49 of the differential 3 to be coaxial.

The output shaft 35 from the differential 3 is coaxial with the input shafts 26, 49 and is fixed to a cage 36 fixed to all satellites 33 (in fact there are four) in the differential 3. The rotation speed of the output shaft 35 depends on the rotation speed of the input shafts 26, 49, this function being defined by the structure of the differential 3. The differential 3 and the power transmission system are arranged such that the rotation speed of its output shaft 35 is as constant as possible despite variations in the speed of the LP rotor 1 and the HP rotor 2.

The output shaft 35 from the differential 3 is the input shaft to the turbo-shaft engine accessory gearbox 5. This accessory gearbox comprises a casing 50 containing gears 51 connected to its input shaft 35 and driving various elements, namely an alternator 52, a lubrication pump 53, a hydraulic pump 54, a fuel pump 55 and two generators/starters 56, 57. The accessory gearbox 5 is well known to a person skilled in the art and will not be described in more detail.

Thus, with the power (and therefore movement) transmission system according to the invention, it is possible to drive the accessory gearbox 5 by drawing off mechanical energy on the LP rotor 1 and the HP rotor 2, by making the power transmission shafts 12, 22 pass through the successive different arms in the fan frame. In the case considered, the transfer gearboxes 13, 23 are arranged in the arms at the compressor case, between the inner fan flow case and the outer core engine flow case, the accessory gearbox 5 being mounted on the outer case, but it is obvious that the invention is applicable to any arrangement of the accessory gearbox 5, for example on the outer casing of the fan frame, in line with the fan case. The power transmission box 4 fills in the distance between the centre lines of the output shafts 16, 26 from the transfer gearboxes 13, 23.

The dimensions of the power transmission system are restricted, since the increase in the transmission speed to adapt the speed of the LP rotor 1 and the HP rotor 2 takes place progressively. In this case, the LP rotor 1 is connected to the transfer gearbox 4, because its rotation speed is lower than the speed of the HP rotor 2, so that a greater increase is necessary. The increase in the rotation speed between the HP rotor 2 and the differential 3 takes place at the power transmission pinions 20, 21 and the pinions 24, 25 in the transfer gearbox 4.

For information, the rotation speed of the LP rotor 1 of a turbo-shaft engine is usually between 650 and 6 000 rpm, and the rotation speed of the HP rotor 2 is between 8 000 and 17 000 rpm. The rotation speed of the differential can then be between 8 500 and 21 000 rpm. These speeds are given for guidance. The variation range of differential output speeds must not exceed a ratio of 3 between the idle speed and maximum speed.

In this invention, the various pinions in the power transmission system are used to increase the rotation speed of the different shafts from rotors 1 and 2 as far as the differential 3, but it is obvious that they could equally well be arranged so as to reduce it throughout the system, or just within some portions, if necessary.

The invention claimed is:

1. Twin turbo-shaft engine comprising a high pressure rotor and a low pressure rotor, at least one accessory gearbox driven by mechanical transmission means, main drive pinion means, on each rotor, driving power transmission means each associated with an input to a differential, the output of which drives a drive shaft of the accessory gearbox, characterised wherein the power transmission means extend in two different structural arms, the power transmission means of one of the rotors being connected to a power transfer box fulfilling two functions, firstly transmission of power to an input to the differential, and secondly modification of the transmission speed.

2. Turbo-shaft engine according to claim 1, wherein modification of the transmission speed is a speed increase.

3. Turbo-shaft engine according to claim 1, wherein the power transmission means connected to the power transmission box are the power transmission means associated with the low pressure rotor.

4. Turbo-shaft engine according to claim 1, wherein inputs to the differential are concentric.

5. Turbo-shaft engine according to one of claims 3 and 4, wherein the power transmission means associated with the high pressure rotor are connected to a bevel gearbox, for which the output shaft forms an input shaft to the differential, the power transmission means associated with the low pressure rotor are connected to a bevel gearbox for which the output shaft forms the input shaft to the power transfer box, for which the output shaft forms a second input shaft to the differential, extending concentrically around the other input shaft to the differential.

6. Turbo-shaft engine according to claim 1, wherein the differential comprises a planet gear, a cage and satellites, the planet gear being connected to an input to the differential, the cage being connected to the other input to the differential, and the satellites being connected to the input shaft to the accessory gearbox.

* * * * *